United States Patent
Barber

(10) Patent No.: US 12,454,931 B2
(45) Date of Patent: Oct. 28, 2025

(54) VERTICAL INTERMINGLING OF DEEP WATER

(71) Applicant: Gerald L. Barber, Greenville, SC (US)

(72) Inventor: Gerald L. Barber, Greenville, SC (US)

(*) Notice: Subject to any disclaimer, the term of this patent is extended or adjusted under 35 U.S.C. 154(b) by 0 days.

(21) Appl. No.: 19/094,925

(22) Filed: Mar. 30, 2025

(65) Prior Publication Data
US 2025/0223939 A1    Jul. 10, 2025

Related U.S. Application Data

(63) Continuation-in-part of application No. 18/469,447, filed on Sep. 18, 2023.

(60) Provisional application No. 63/418,369, filed on Oct. 21, 2022, provisional application No. 63/407,638, filed on Sep. 17, 2022.

(51) Int. Cl.
| | | |
|---|---|---|
| F03B 13/10 | (2006.01) | |
| F03B 3/12 | (2006.01) | |
| F03B 17/06 | (2006.01) | |

(52) U.S. Cl.
CPC ............ F03B 13/10 (2013.01); F03B 3/126 (2013.01); F03B 17/06 (2013.01); *F05B 2220/706* (2013.01); *F05B 2260/42* (2013.01); *F05B 2260/70* (2013.01); *F05B 2270/20* (2013.01)

(58) Field of Classification Search
CPC .......... F03B 13/10; F03B 3/126; F03B 17/06; F05B 2220/706; F05B 2260/42; F05B 2260/70; F05B 2270/20
USPC ....................................... 290/43, 54
See application file for complete search history.

(56) References Cited

U.S. PATENT DOCUMENTS

| | | | | |
|---|---|---|---|---|
| 4,251,040 A * | 2/1981 | Loyd | ...................... | B64U 10/50 416/85 |
| 4,850,190 A * | 7/1989 | Pitts | ........................ | F03B 13/10 60/495 |
| 6,091,161 A * | 7/2000 | Dehlsen | ................... | F03B 13/10 290/43 |
| 6,531,788 B2 * | 3/2003 | Robson | ................. | F03B 17/061 290/43 |
| 7,291,936 B1 * | 11/2007 | Robson | ................. | F03B 17/061 290/43 |
| 7,541,688 B2 * | 6/2009 | Mackie | ................. | F03B 17/061 290/54 |

(Continued)

FOREIGN PATENT DOCUMENTS

| | | | | |
|---|---|---|---|---|
| GB | 2441821 A | * | 3/2008 | ............ F03B 13/183 |
| WO | WO-2005065024 A2 | * | 7/2005 | ............ F03B 13/181 |

*Primary Examiner* — Charles Reid, Jr.
(74) *Attorney, Agent, or Firm* — Kim and Lahey Law Firm, LLC; Douglas William Kim

(57) ABSTRACT

This invention is directed to a system for vertical intermingling of deep water comprising: a surface support; an intake line having distal end disposed at an ocean depth; a pump in fluid communications with a proximal end of the intake line so that when the pump is actuated, fluid from the distal end of the intake line is transferred from the ocean floor toward the proximal end; and, an outlet line in fluid communications with the inlet line configured to direct fluid from the inlet line to a shallowed depth that the fluid origination depth. The intake line draws water from the ocean depth and transfer the water, having nutrient rich material, to a shallower depth so that ocean productivity can be increased.

6 Claims, 14 Drawing Sheets

(56) References Cited

U.S. PATENT DOCUMENTS

| | | | |
|---|---|---|---|
| 2007/0176432 A1* | 8/2007 | Rolt | F03D 9/255 |
| | | | 290/55 |
| 2008/0018115 A1* | 1/2008 | Orlov | F03B 17/061 |
| | | | 290/54 |
| 2009/0140524 A1* | 6/2009 | Kejha | F03B 17/061 |
| | | | 290/52 |
| 2010/0221112 A1* | 9/2010 | Bevirt | F03D 5/00 |
| | | | 416/135 |
| 2011/0095530 A1* | 4/2011 | Blumer | F03B 17/061 |
| | | | 290/43 |
| 2012/0212350 A1* | 8/2012 | Magnell | F03B 13/10 |
| | | | 367/134 |
| 2013/0036731 A1* | 2/2013 | Kerckove | F03B 13/264 |
| | | | 60/495 |
| 2013/0221679 A1* | 8/2013 | Vander Lind | F03D 9/25 |
| | | | 290/55 |
| 2016/0013703 A1* | 1/2016 | Marzelius | H02K 7/1876 |
| | | | 290/43 |

* cited by examiner

VERTICAL INTERMINGLING OF DEEP WATER

RELATED APPLICATIONS

The present application is a non-provisional application that claims priority to U.S. patent application Ser. No. 18/469,447 which claims priority ti U.S. Provisional Patent applications 63/407,638 filed Sep. 17, 2022 and 63/418,369 filed Oct. 21, 2022 all of this are incorporated by reference.

BACKGROUND OF THE INVENTION

1) Field of the Invention

This invention is directed to a system for promoting the vertical intermingling of deep water with mid or shallow water to increase the nutrients and biomass in shallow or mid water.

2) Description of the Related Art

Ocean productivity largely refers to the production of organic matter by "phytoplankton," plants suspended in the ocean, most of which are single-celled. Generally, phytoplankton harvesting light to convert inorganic carbon to organic carbon where this organic carbon is provided to multiple organisms that obtain energy from the respiration of organic matter (i.e., heterotrophs). The phytoplankton energy (e.g., food source) includes life forms such as from bacteria, zooplankton, fish, marine mammals as well as ocean floor organisms. Phytoplankton allows for increased food supplies and a more productive ocean area. Because of the cycle of energy production, at the ocean surface Upwelling is a natural phenomenon where fluid motion, typically driven by wind, causes deep water to flow to the surface. In the ocean, nutrient-rich water exists at depths that include mid water, deep water, and even ultra-deep water. Because of the depth, and cooler temperatures of deep water, this water contains much more nutrients than water at the surface. One factor is that there is more organic matter decomposing at these depths and on the ocean floor. The vehicles which result in organic matter to "falling" to the ocean floor include sinking particulate organic carbon, deceased mammals (e.g., whales) sinking to the ocean floor and other biogenic processes. For example, biogenic (biologically derived) sediment can be produced by marine plankton which includes, generally, microscopic unicellular plants and animals that can float near the top of the ocean. These organisms can include shells that can be composed of calcium carbonate ($CaCO^3$) or silica ($SiO_2$) that can contribute to biological material at ocean depths. At ocean depths, especially in deep water, the cooler temperatures and lack of sunlight inhibit processes such as photosynthesis which leads to a store of biological materials at depth. For example, off the coast of Washington state, such as in Puget Sound, submarine canyons exist that can be over 1300 feet deep. Water and bioorganic material from the ocean floor can be brought up to the top through processes such as upwelling.

Unfortunately, upwelling generally requires natural phenomena such as winds pushing surface water away from underwater sloped areas causes deeper water beneath the surface to replace the "pushed away" water. This action also brings nutrient (deeper and colder) water to the surface. One description of this action has been called the "Ekman transport." This definition stems from the Ekman motion theory which states that winds are the main source of energy for ocean circulation. Ekman transport occurs when ocean surface waters are influenced by the friction force acting on them caused by the wind. As the wind blows across the surface, the wind creates a friction force on the surface that can drag the upper 10 meters to 100 meters of a water column with the wind. The Coriolis effect, however, causes ocean water to move at a 90° angle from the direction of the surface wind. The direction of transport (e.g., water motion) is dependent on the hemisphere so that in the northern hemisphere, transport occurs at 90° clockwise from wind direction, and in the southern hemisphere transport occurs at 90° anticlockwise. It would be desirable to have the ability to creates upwells without sole reliance upon atmospheric and natural conditions.

Upwelling can also occur due to the water motion at the equator. Equatorial upwelling can occur, for example, when there is a southeast trade wind crossing the geographic equator such as at about 5 degrees which can cause upwelling when combined with a south equatorial current. Again, it would be desirable to have the ability to creates upwells without sole reliance upon atmospheric and natural conditions.

There are also upwelling zones that are naturally occurring. It has been reported that there are at least five major areas of upwelling in the west costs of continents which account for about 25% of the global fish supply.

Because upwelling replaces the warmer and usually nutrient-depleted surface water, upwelled water stimulates the growth and reproduction of primary producers such as phytoplankton. The biomass of phytoplankton and the presence of cool water in those regions allow upwelling zones to be identified by cool sea surface temperatures (SST) and high concentrations of chlorophyll-a. The increased availability of nutrients in upwelling regions results in high levels of primary producers (e.g., phytoplankton) which results in higher fishery production. The most productive and fertile ocean areas, upwelling regions are important sources of marine productivity. They attract hundreds of species throughout the trophic levels according to marine research. While studying the trophic levels and patterns typical of upwelling regions, researchers have discovered that upwelling systems exhibit a wasp-waist ecosystem (an ecosystem where an intermediate trophic level is expected to control the abundance of predators through a bottom-up interaction and the abundance of prey through a top-down interaction). In this type of ecosystem, research shows that the high and low trophic levels are well represented by high species diversity. This research found that the intermediate trophic level is only represented by one or two species. This trophic layer, which consists of small, pelagic fish usually makes up about only three to four percent of the species diversity of all fish species present. The lower trophic layers were found to be well-represented with about 500 species of copepods, 2500 species of gastropods, and 2500 species of crustaceans on average. At the apex and near-apex trophic levels, there were found about 100 species of marine mammals and about 50 species of marine birds. The vital intermediate trophic species however are small pelagic fish that usually feed on phytoplankton.

In most upwelling systems, these species are either anchovies or sardines, and usually only one is present, although two or three species may be present occasionally. These fish are an important food source for predators, such as large pelagic fish, marine mammals, and marine birds. Although they are not at the base of the trophic pyramid, they are the vital species that connect the entire marine ecosystem and keep the productivity of upwelling zones so high.

It is also known that nutrient concentrations in certain currents or "streams" of the ocean (e.g., the Gulf Stream) are elevated relative to concentrations to either side of the current. It has been proposed that the Gulf Stream current's nutrient transport ultimately enriches the mixed layers of both the subpolar and subtropical North Atlantic and even potentially sustains primary productivity in both gyres. When studied, the Gulf Stream seems to have a nutrient stream that has a tube shape horizontally along the ocean. Nutrient concentrations in the Guld Stream are elevated when compared to either side of the stream. In fact, one report shows that nitrate concentrations in the Gulf Stream can exceed concentrations to either side by as much as 10 mmol m$^3$ with correspondingly high concentrations of the other dissolved nutrients, such as phosphate. Therefore, it would be advantageous to be able to transport the water deeper in the Gulf Stream to the surface to facilitate ocean production. This is also true for other "streams" that exist in the ocean such as the currents listed below:

| | | | |
|---|---|---|---|
| North Equatorial | Kuroshio | North Pacific | Alaskan |
| Counter Equatorial | El Nino | Tsushima | South Equatorial |
| East Australian | Humboldt | Kuril or Oya shio | California |
| Antarctica | Okhotsk | Florida | Gulf Stream |
| Norwegian | Irminger | Rannell | Antilles |
| Brazilian | Labrador | Canary | Eastern Greenland |
| Benguela | Antarctica | Falkland | Mozambique |
| Agulhas | SW Monsoon | NE Monsoon | Somali |
| Western Australian | South Indian Ocean | | |

It would be advantageous to have upwelling in areas that are not dependent upon the natural occurrences currently relied upon to bring deep nutrients from the ocean to the surface to improve ocean productivity.

BRIEF SUMMARY OF THE INVENTION

The above objectives are accomplished by providing a system for vertical intermingling of deep water comprising: a surface support such as a barge, buoy, ship, platform, raft, and the like; an intake line having distal end disposed at an ocean depth and a proximal end disposed at a shallowed depth; a pump in fluid communications with the intake line at the distal end, proximal end or in between so that when the pump is actuated, fluid from the an intake is transferred from the ocean depth toward an outlet at the proximal end; and, an outlet line in fluid communications with the inlet line configured to disburse fluid from the inlet to the shallowed depth. The outlet line can be configured to extend between 30 and 90 degrees related to an axis along the surface support widening the area of disbursement. An intake assembly can include an intake housing that can be disposed at the distal end of the intake line.

The surface support can include a positioning assembly to maintain a position of the surface support, propel the surface support along a predetermined path, maintain the surface support at a static position when placed in a current and any combination thereof.

The system can include a surface support; an intake line carried by the surface support having distal end disposed at an ocean depth and a proximal end disposed at a shallowed depth; an intake assembly disposed at the distal end; a pump included in the intake assembly adapted to transfer fluid from the intake assembly, into the intake line, and toward the proximal end; and, an outlet assembly in fluid communication with the intake line configured to direct fluid from the intake line to the shallowed depth.

The intake assembly can include an energy conversion member adapted to convert an ambient water current into an energy provided to the pump thereby actuating the pump. The energy conversion member can be taken from the group consisting of a blade, turbine, screw, impeller, vanes, propeller, and any combination thereof. The intake assembly can include a pivot allowing the intake assembly to rotate relative to the surface support and an energy conversion member imparts drag in response to an ambient water current thereby positioning an intake included in the intake assembly into the ambient water current.

The outlet assembly can include lateral dispersant lines wherein the outlet assembly can include a first disbursement line at a first depth and a second dispersant line at a second depth. An anchor can be attached to the intake assembly adapted to secure the intake assembly to an ocean floor. An anchor can also be attached to the surface support to secure the surface support to the ocean floor. A power source carried by the surface support and a power transfer line extending from the power source to the pump can be included.

The intake assembly can include a water foil that can generally be in the shape of a wing. The water foil can water foil flaps adapted to maintain the water foil in a horizontal orientation. The water foil can be attached to an anchor line or other line that can include a weight to assist with stabilization of the water foil and intake assembly as well as generally maintain the water foil in a horizontal orientation. The water foil can include a horizontal stabilizer adapted to maintain the water foil in a horizontal orientation and a vertical stabilizer carried by the horizontal stabilizer as well.

The surface support can be a barge and a positioning assembly carried by the barge can be adapted to maintain a position of the barge relative to a current or stream. The positioning assembly can be adapted to propel the barge along a predetermined path. The surface support can be a barge and a positioning assembly carried by the barge can be adapted to maintain the barge at a static geo-location position.

The distal end can be disposed at a depth greater than 1,000 feet, at a depth in a range of 1,000 feet and 5,000 feet and/or at a depth in excess of 5,000 feet.

The system can include an intake line extending from a surface depth to an ocean depth having a distal end and a proximal end; an intake assembly disposed at the distal end; a pump included in the intake assembly adapted to transfer fluid from the intake assembly, into the intake line, and toward the proximal end; an energy conversion member included in the intake assembly adapted to convert an ambient water current into an energy provided to the pump thereby actuating the pump; and, an outlet assembly in fluid communication with the intake line configured to direct fluid from the intake line to a shallowed depth.

The system can include an intake line extending from a shallowed depth to an ocean depth having a distal end and a proximal end; an intake disposed at the distal end; a pump in fluid communication with an interior of the intake line adapted to transfer fluid from the intake at the ocean depth to an outlet at the shallowed depth; and a water foil carried by distal end adapted to positioning the intake into an ambient current at the ocean depth and maintain a horizontal orientation; and, wherein the outlet is configured to disburse fluid from the intake to the shallowed depth.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Figure 1:
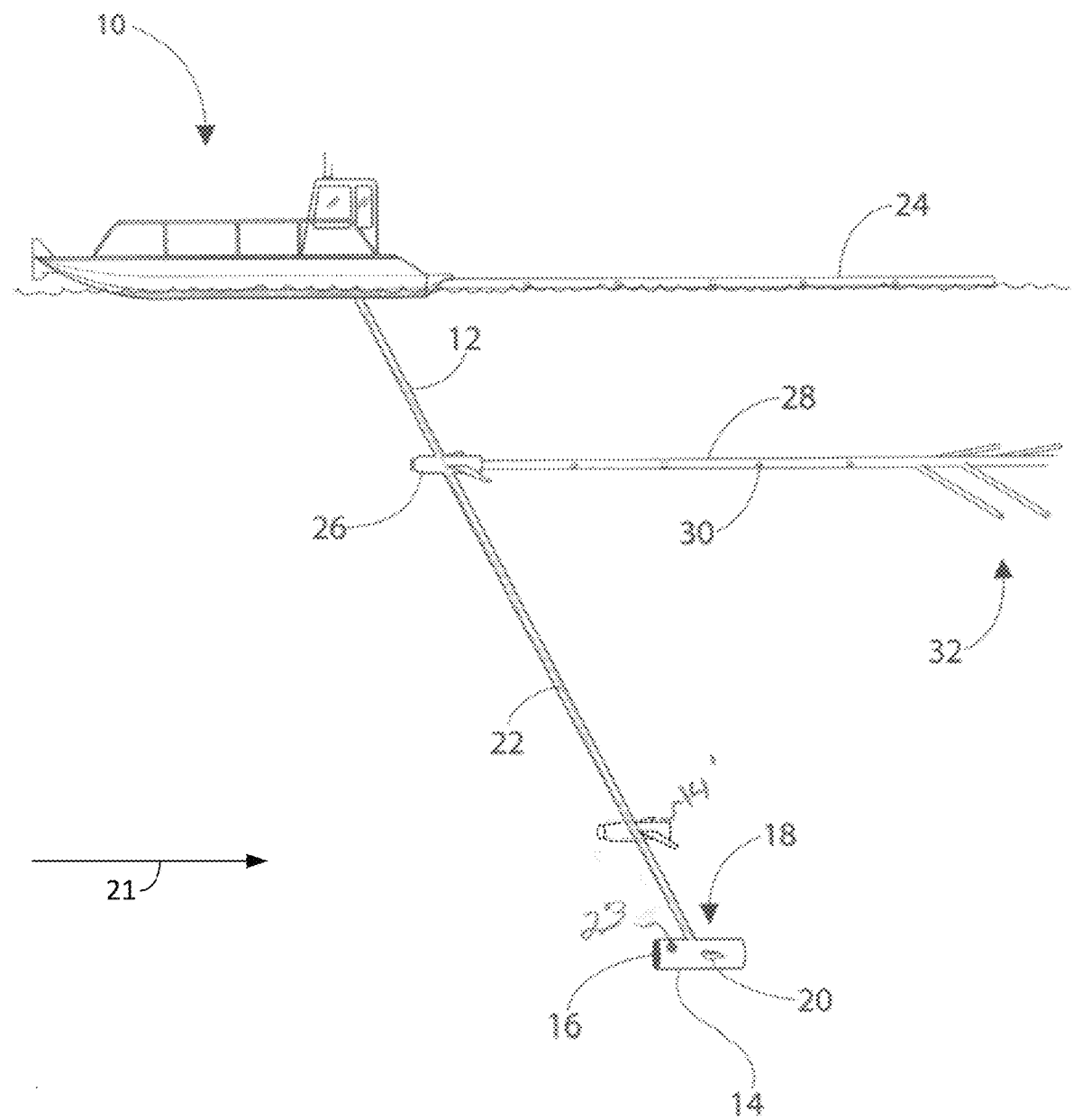
FIG. 1 is a schematic of aspects of the invention.

With reference to the drawings, the invention will now be described in more detail. Referring to FIG. 1, a surface support 10 can have an intake line 12 that reaches toward the ocean floor. The surface support can be anchored, stationary or can be traveling along the ocean surface. When anchored, the surface support can be placed on or in a stream 21 or at any location having deeper nutrient richer water so that nutrients from the ocean depths can be transported toward the surface support. The surface support can include a stabilization system which can include a sensor included in that detects the stream to determine its location. For example, the sensor 23 can extend into the ocean and can determine water movement relative to the position of the surface support. The sensor can be carried by the intake assembly 14 or separated as shown by 23'. When the surface support determines that the surface support is moving away from the stream, the sensor can transmit the information to a drive system which can re-position the surface support back into the stream. The drive system can include a motor, axle, props, impellers, jets, and the like to provide propulsion. For example, the surface support can include a mechanism or system to generate thrust to move a surface support through the water and can include power sources such as steam, solar, electric, carbon fuels and the like.

The intake line 12 can extend 100s or 1000s of meters deep. A pump can be used to pump water from the intake 14 that can be disposed at the distal end of the intake line. A pump can be disposed on the intake housing to draw water into the intake and transport the water upwards to the surface support. The water, upon reaching the surface support, can be directed to an outlet line 24 and/or 28.

The intake assembly 14 can include a screen 16 to prevent oversized objects and particles from entering the intake. In one embodiment, there can be multiple intakes 14' along the intake line so that water can enter the intake line from different depths. The intake can include an intake housing 18 that can include a trailing end so that the inlet is positioned to allow water to enter the intake housing. The inlet housing can include one or more fins 20 that can be static or dynamic to position the inlet housing within the water including positioning them at an upward to downward angle. The fins can be motorized and controlled by an inlet housing fin motor controller. The inlet housing can be controlled from the surface support with a wired connection 22 that can be disposed outside the intake line 12, within the intake line or separated from the intake line.

In one embodiment, the intake line can carry an outlet assembly 26. The outlet assembly can receive fluid from the inlet and divert the fluid to outlet line 28 that can transfer the deeper water to a shallower position at or near the surface. The outline line can include openings 30 long the outline line allowing the water to be dispersed at a shallowed depth than where collected. The outline line can include multiple openings at the distal end 32 to disperse fluid. Secondary outlet lines can be included in the distal end.

In one embodiment, the surface support can include a navigation system that can include a GPS receiver, satellite receives of other such location or position apparatus that can receive external information used by an onboard computer system to determine the location of the surface support. The surface support can also receive information concerning the position of the surface support such as whether it is located (e.g., a predetermined deposition off the coast). In the event that the stream moves, or the surface support moves out of position, the computer system can actuate thrusters, propellers, or other drive system and place the surface support back into the stream. The computer system can also direct the surface support along a predetermined track so that the deeper water is transferred along a coastline or other are of the ocean.

Figure 2:
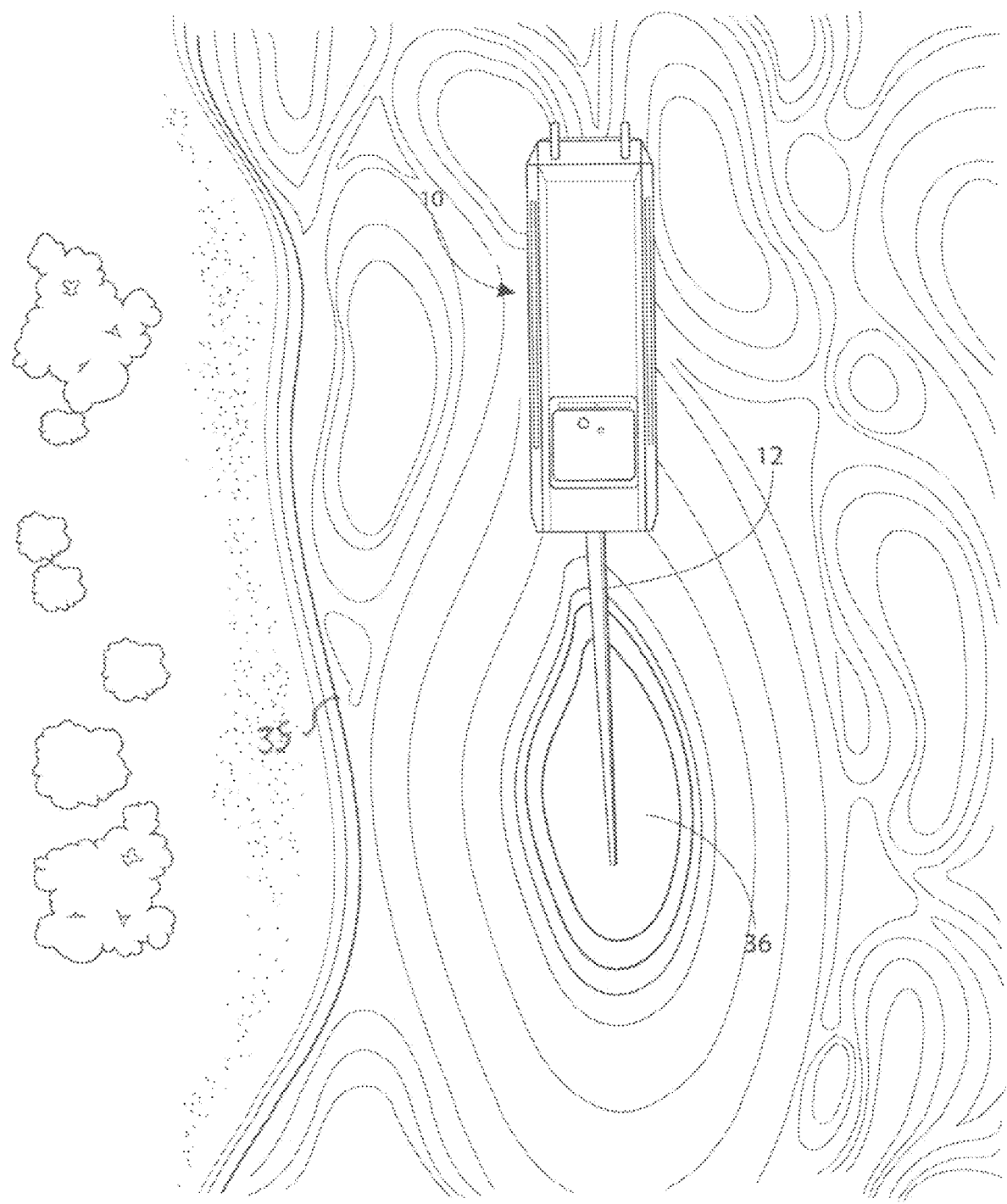
FIG. 2 is a schematic of aspects of the invention.

Referring to FIG. 2, it may be known that a certain area 36 of the ocean have nutrient rich deeper water. Therefore, the surface support 10 can be manually, programmed or automatically positioned so that the inlet line 12 transfers water from these depths to the surface as the surface support remain positioned over this area of the ocean. The surface support can also be directed to travel along a coastline 35 so that the water along such coastline has increased nutrients, thereby increasing ocean productivity.

Figure 3:
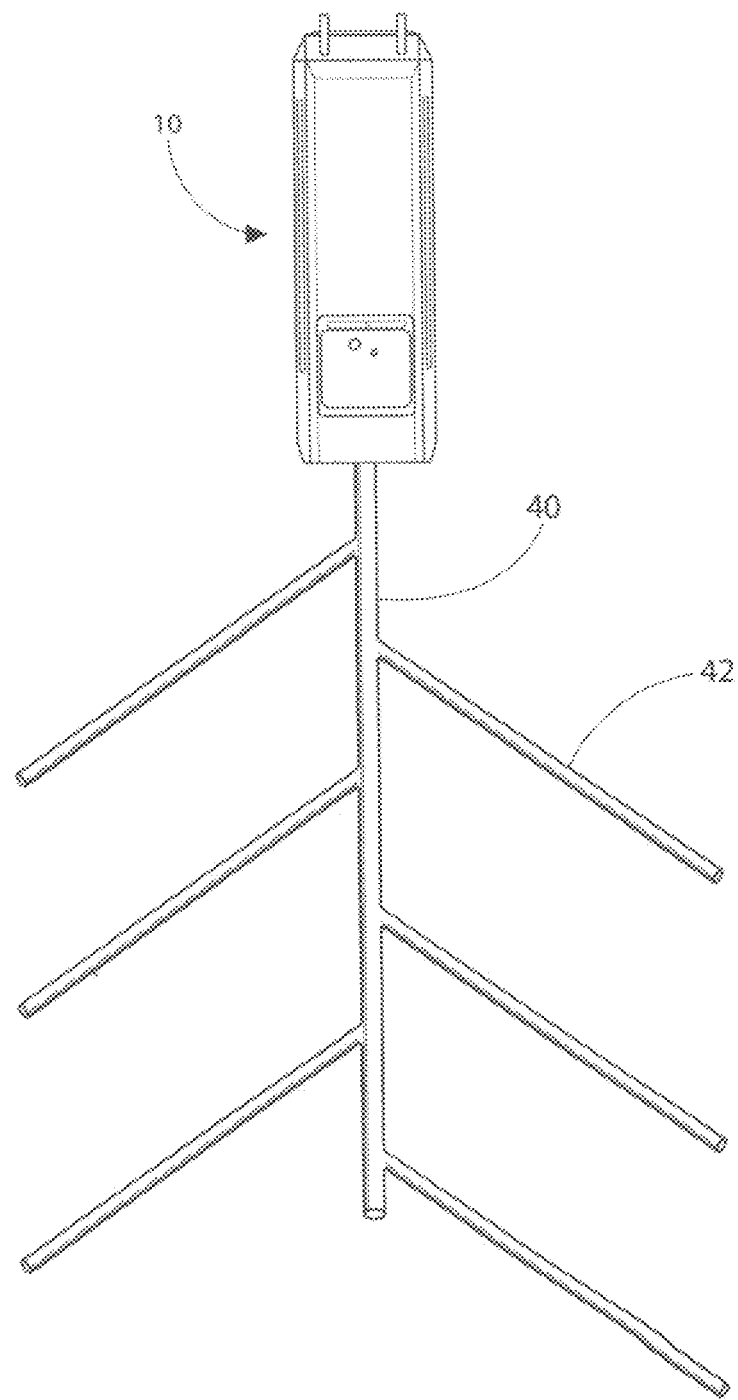
FIG. 3 is a schematic of aspects of the invention.

Referring to FIG. 3, the surface support outlet can include a primary outlet 40 and secondary outlet 42 so that the water transferred at or to the surface or shallowed depth can be dissipated over a wider area relative to the length of the primary outlet. The secondary outline can include lateral disbursement lines that can be rigid or flexible. The outlet assembly can also include multiple outlets and outlet lines at varying depths to further dissipate the transferred water and nutrients.

Figure 4:
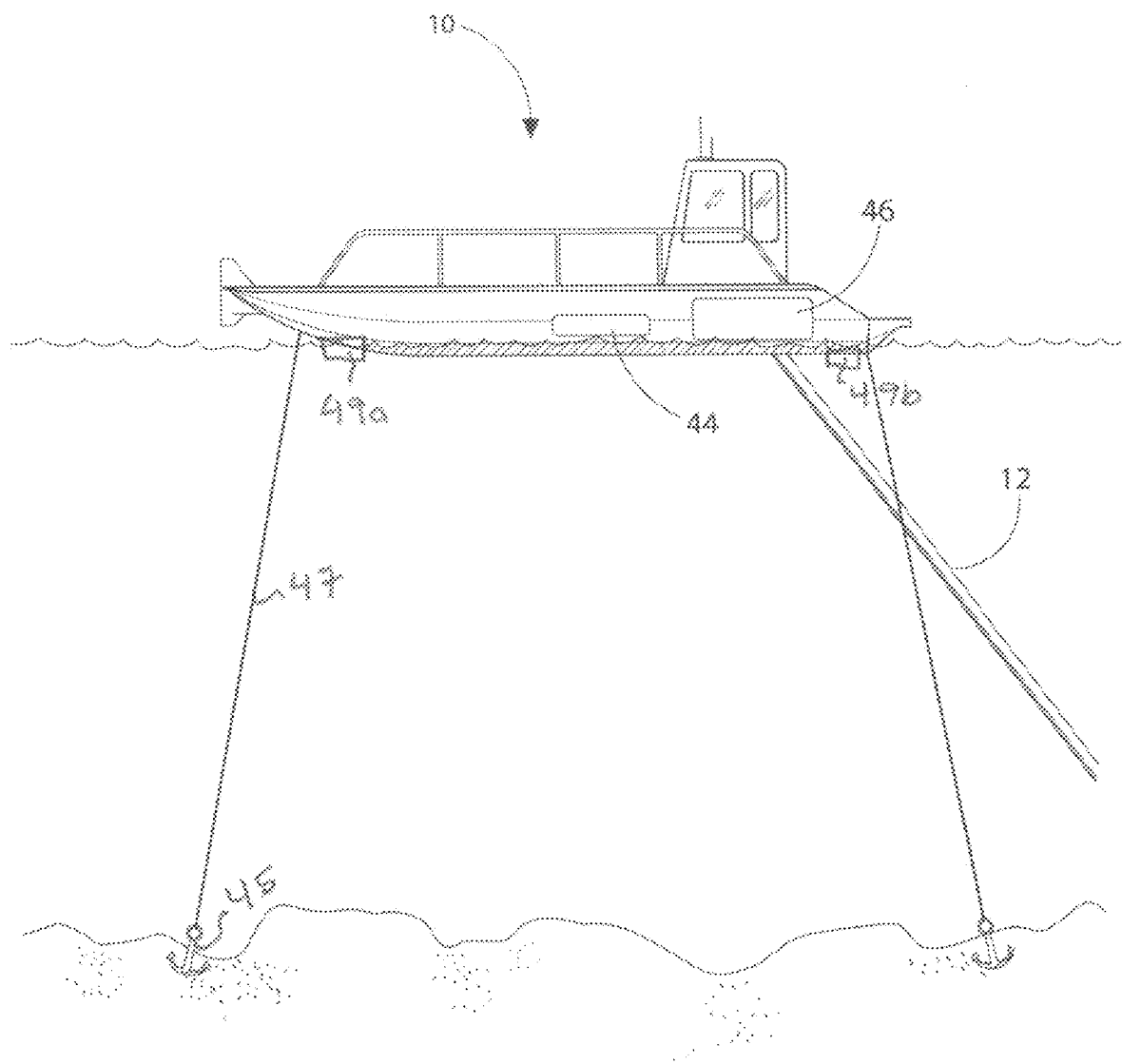
FIG. 4 is a schematic of aspects of the invention.

Referring to FIG. 4, the surface support 10 can be anchored to the ocean floor using anchor 45 and anchor line 47. The surface support can include a pump 44 that can be powered by a power source 46 such as diesel engine or electrical motor. The inlet can be included with the pump so that when the pump is on, water from the ocean depth is transferred through the inlet 12 and dissipated at or near the surface. In the event that there is a current present, such as flowing from the bow to the stem of the surface support, the inlet can be positioned (e.g., angled) toward the stern. The pump can be a high-volume electric pump.

When the deeper water is transferred to or at the surface, a current can further dissipate the water, and therefore the nutrients, closer to the surface of the ocean. The surface support can be anchored or free floating. The surface support can be pulled by another vessel. In one embodiment, surface water (e.g., warner water) can be pumped from the ocean and combined with the deeper (e.g., colder water) so that the colder water will have less of a tendency to sink (e.g., temperature gradient).

The surface support can include bow 49*a* and stern 49*b* thruster systems. The water pump can be positioned along the intake line and can be disposed in an aerodynamic shaped pod which can be located at the end of the intake line. The intake line and outlets and outlet lines can be stowed on the surface support until needed. A navigation system, using location information, can use a thruster system and propulsion system to move the surface support or to have it remain stationary. For example, if the surface support is in a stream, it can be positioned with the bow toward the stream and propelled at the same speed at the stream so that the surface support relative position is static.

The intake line, outlet lines, intake assembly, pods, pumps and other components can include wings (fins) that are controllable from the surface support or controller system to control the depth of the intake line and outlets. The intake assembly or other assembly can be positioned at the distal end so that the line extends into the ocean depths. Components of the system can include non-compressible material (such as wood) so that such components generally have neutral buoyancy. Electrical lines for powering components (e.g., intake assembly, sensors, etc.) can run alongside (or inside) the intake line for providing electricity and transmitted data to and from components at depth.

The surface support can include monitoring assemblies that can retrieve and receive data from sensors and monitors attributes of the deeper water such as flow rate, current, nutrients density, nutrient type, and the like.

The outlet can include multiple outlets and have multiple orientations so that water transferred at or to the surface is disbursed as much as possible so that it is possible to fertilize millions of square miles of the ocean.

The use of this invention can provide for a reduction in the $CO_2$ which has been attributed to global warming. Further, the increase of ocean productivity and results in a significant increase in sea life. Such an effect can result in an improved fishing industry and increased in pelagic species.

The operation of such a system would not require large crews and use little fuel. The surface support can include solar panels and wind turbines to generate and supplement electrical power. The energy needed for operation of the intake line is not great as it requires little energy to pump a very large volume of water since the principal inefficient is resistance due to friction in the intake line so that the difference in the weight of cold water and the warmer surface water which is slight.

By cooling water on the surface over a very large area, the development of hurricanes and other tropical storms can be reduced or diminished.

In the event of a storm, the intake lines and outlets can be stored on the surface support and the surface support can be moved out of the path of such as weather event.

Figure 5:
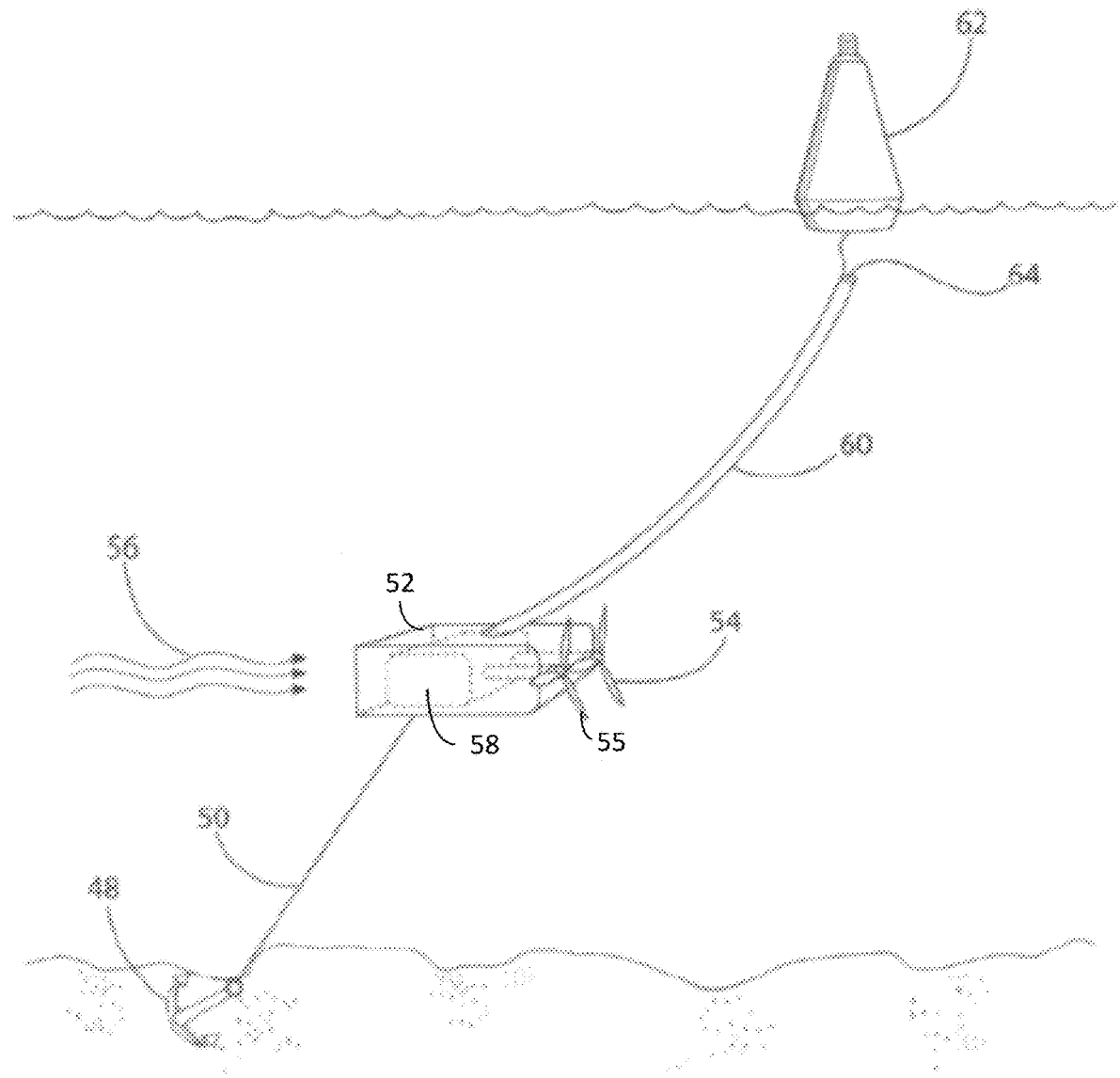
FIG. 5 is a schematic of aspects of the invention.

Referring to FIG. 5, one embodiment includes an anchoring assembly 48 that can be affixed to an anchoring line 50. The anchoring line can be attached to a pumping assembly 52 that can be generally neutrally buoyant or slightly positively buoyant. The pumping assembly can include propellers or turbines 54 that can extract energy from a current 56 and direct the enter to a pump 58. The pump can draw water from the ocean and direct the water to an intake line 60 directing the water to or near the surface. The top of the intake line can be positively buoyant so that is "floats" at or near the surface. The surface support can be buoy 62 can be attached to the intake line to support the outlet end 64 of the intake line 60 at or near the surface. In one embodiment, the propellers, turbines, and energy conversion system can be disposed closer to the surface and the pumping assembly can be disposed at depth. The pump can be connected to the energy conversion system through electrical connections that can run in or along the intake line. The energy conversion system can include one or more blades or turbines 55 that can be counter rotating so as to reduce or prevent torque.

In one embodiment, the second pump can be disposed shallower than the first pump to add warmer water to the water in the intake line. Therefore, the water that is dispersed is warmer than water originating a depth solely, so that the dispersed water does not sink as quickly. This allows for more nutrient rich water to remain at or near the surface.

Figure 6:
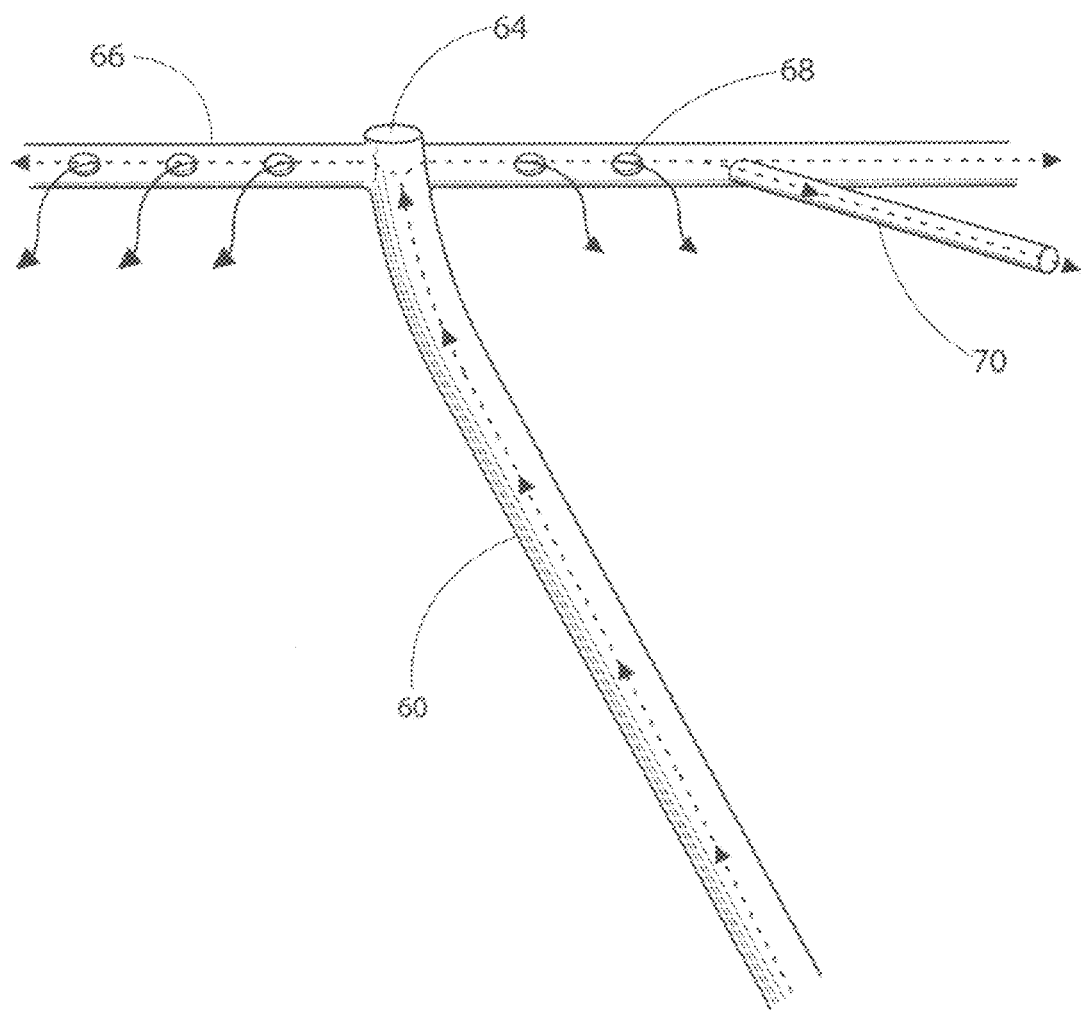
FIG. 6 is a schematic of aspects of the invention.

Referring to FIG. 6, the outlet end 64 of the intake line 60 can include lateral dispersant lines 66 which direct the water drawn from the depth by the pump laterally so that the area receiving nutrient rich waters is increased. The later lines can include openings 68 that can disperse the water drawn from depth across or near the surface. The openings 68 can include secondary dispersant lines 70 that can further disperse the water. In one embodiment, the pump assembly can include a pressure resistance housing for container the pump and other components.

Figure 7:
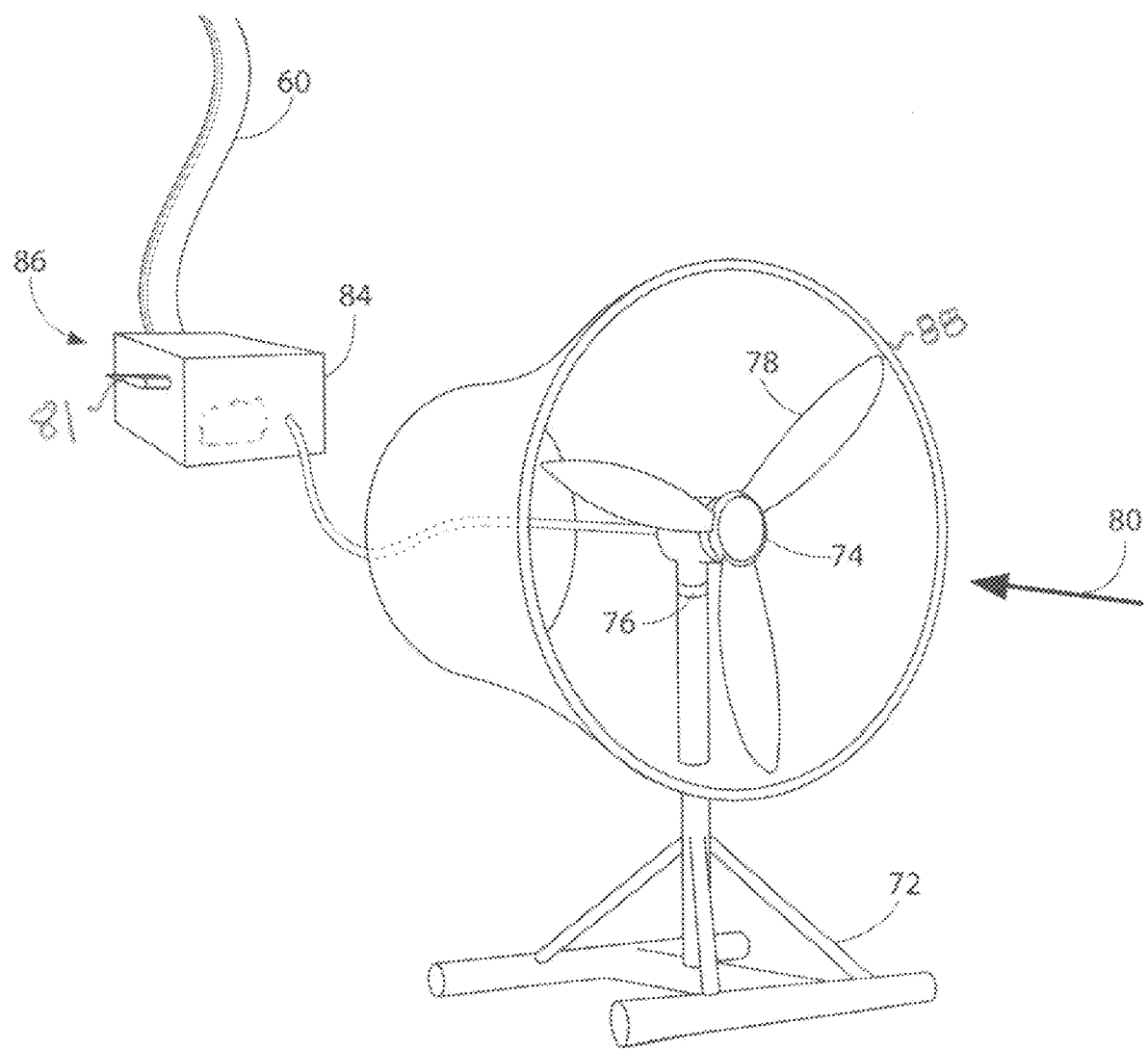
FIG. 7 is a schematic of aspects of the invention.

Referring to FIG. 7, a base 72 can support the energy conversion system 74. The energy conversion system can rotate around bearing 76 so that the blades 78 are generally perpendicular with the current 80. The bearing can include a actuator that according to sensors in communications with the controller can rotate the bearing so that the propeller are perpendicular to the current. The propellers can be facing into the current as shown in FIG. 7 or can be trailing from the energy conversion system. In one embodiment, the bearing is free floating so that the current biases the propellers down current relative to a housing including in the energy conversion system. The energy conversion system can convert energy from a current or stream into power such as electricity which can be used to power the controller, brake, sensor and other components in one embodiment.

The energy generated from the energy conversion system can be transmitted to a pump 84 that can be disposed along the intake line 60. As shown, the pump is disposed at or near inlet 86 of an intake assembly. The pump can be disposed in a pump assembly. The pump and pump assembly can carry a fin or wing 81 that can position the pump relative to the current as well as lift the pump due to the current. The pump and pump assembly can have positive buoyance and be attached to the base or anchored to the ocean floor. In one embodiment, a shroud 88 can surround the blades or turbine to improve efficiency such as taken advantage of Bernoulli effect wherein a front portion of the shroud can be wider in diameter than a portion of the shroud closer to the blades.

The pump can be adapted for displacing 100,000 gallons per minute from the ocean depth to the surface or near the surface. The ocean depths can be in excess of 1,000 feet and can be in excess of 5,000 feet.

The advantages that are provided by this system include increased nitrogen at the surface, reduction $CO_2$, and increased in $O_2$ levels from more productive ocean life such as resulting from increased algae and phytoplankton at or near the surface.

Figure 8:
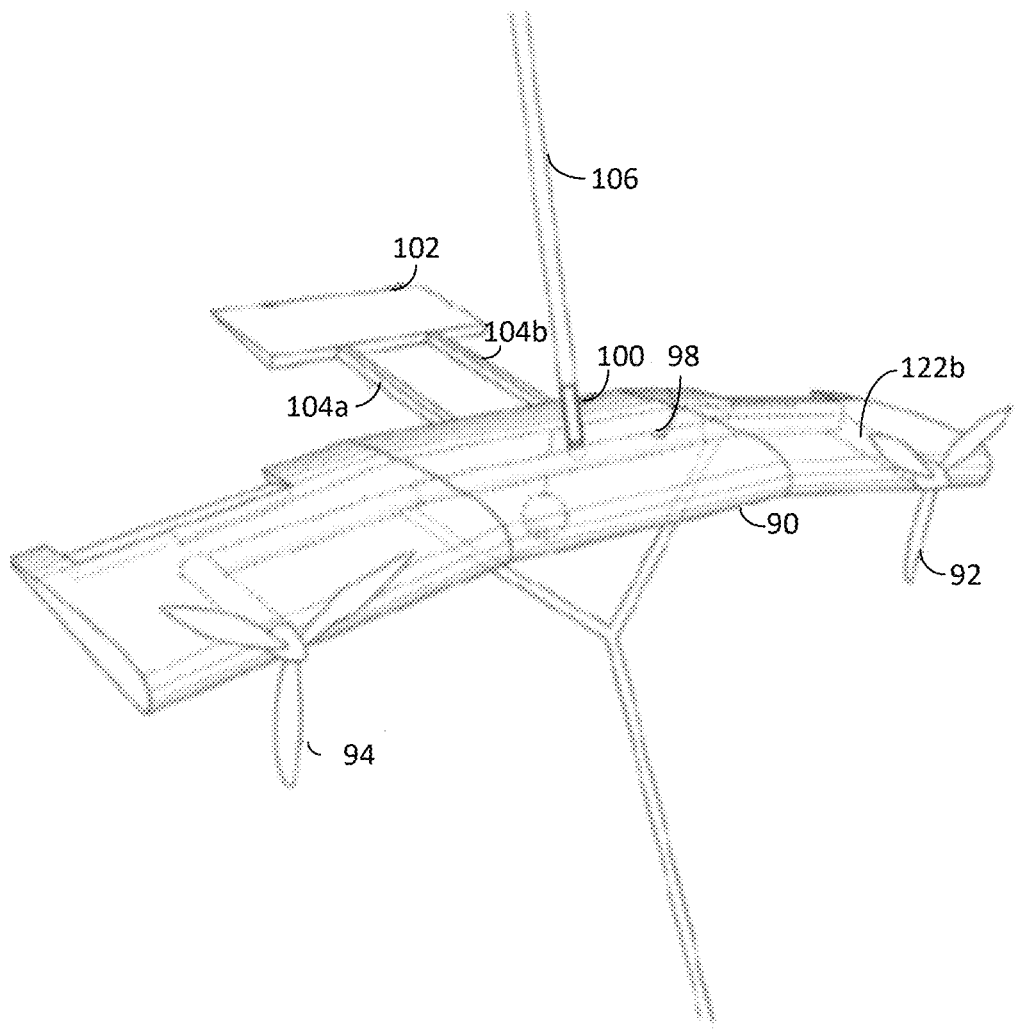
FIG. 8 is a schematic of aspects of the invention.

Referring to FIG. 8, a wing shaped water foil 90 can include two propellers 92 and 94 that can drive pumps 96a and 96b, with a pump positioned near each end of the water foil. The pumps may be submersible turbine pumps that are driven by ocean currents passing across the propellers. The ocean currents rotate the propellers and turn the pumps to pump deep water and associated nutrients to the surface of the water. The pumps operate independently. For example, if one is disabled, the other will continue to operate. The propellers convert energy from the current passing across the propellers to rotate the pumps which cause water surrounding the pump into a foil conduit 98 to a water conduit 100. The foil conduit and the water conduit can be flexible. The diameter of the conduits can vary according to the pump capacity and the fluid through put desired.

A horizontal stabilizer 102 can extend from a rear of the water foil. The horizontal stabilizer can be on the opposite side of the water foil from the propellers. The horizontal stabilizer is supported by struts 104 and 104b that extend generally horizontally from the water foil and connect the horizontal stabilizer to the water foil. A vertical stabilizer may extend from the horizontal stabilizer to reduce horizontal motion of the device. The horizontal stabilizer can slide along the struts toward and away from the water foil and be adapted to maintain a horizontal position of the water foil. Due to environmental forces, such as current and swells, the water foil can be caused to pitch up or down. When the water foil pitches, the horizontal stabilizer will be exposed to forces above or below the water foil that apply forces to the water foil to bias the water foil back to a horizontal position.

In one embodiment, the water foil, the horizontal stabilizer, and the struts are formed of fiberglass. It is preferred that the construct is formed of materials that are resistant to corrosion from saltwater, such as fiberglass, high density polyethylene or other impact resistant plastics.

Figure 9:
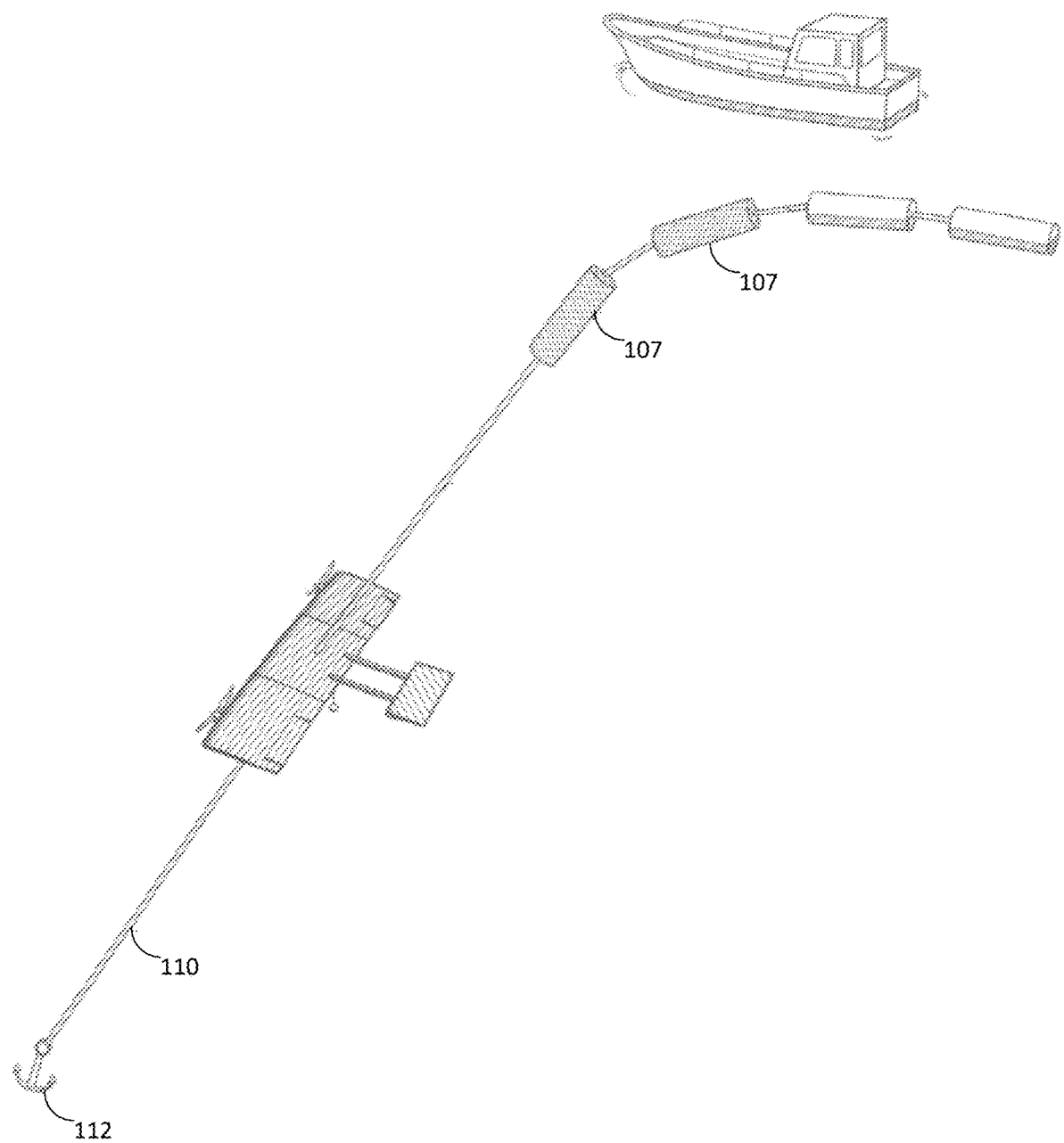
FIG. 9 is a schematic of aspects of the invention.

Referring to FIG. 9, an intake line 106 extends from the water foil. The intake line communicates with the pumps, receives water flowing under pressure from the pumps, and transfers the deep water to the surface of the ocean or other body of water. The flexible water conduit is of sufficient length to reach from the water foil to the surface of the ocean or other body of water and may be hundreds or thousands of meters in length, depending upon the application. One or more floats 106 may be employed to hold the distal end of the flexible water conduit at or near the surface of the water.

The water foil may be anchored by an anchor line 110 comprising an anchor 112 at a lower end of the anchor line. The anchor line preferably reaches the floor of the ocean or body of water, thereby limiting travel of the water foil. The anchor line can be a Y-shaped where it connects to the water foil at two contacts points laterally spaced. The lower end of the anchor line is attached to the anchor, and the upper ends of the anchor line are attached to the water foil, with each end of the anchor line attached opposite the center of the water foil from the other end of the anchor line. The Y shaped attachment of the anchor line aids in leveling the water foil. This configuration allows the water foil to maintain a horizontal position relative to a roll. Were one side of the water foil to rise, the Y connection would bias the water foil back to a horizontal position. In one embodiment, the water foil is shaped so as to create "lift" when current passes over the water foil so that were one side to rise, the other side would bias the water foil to a horizontal position.

Figure 10:
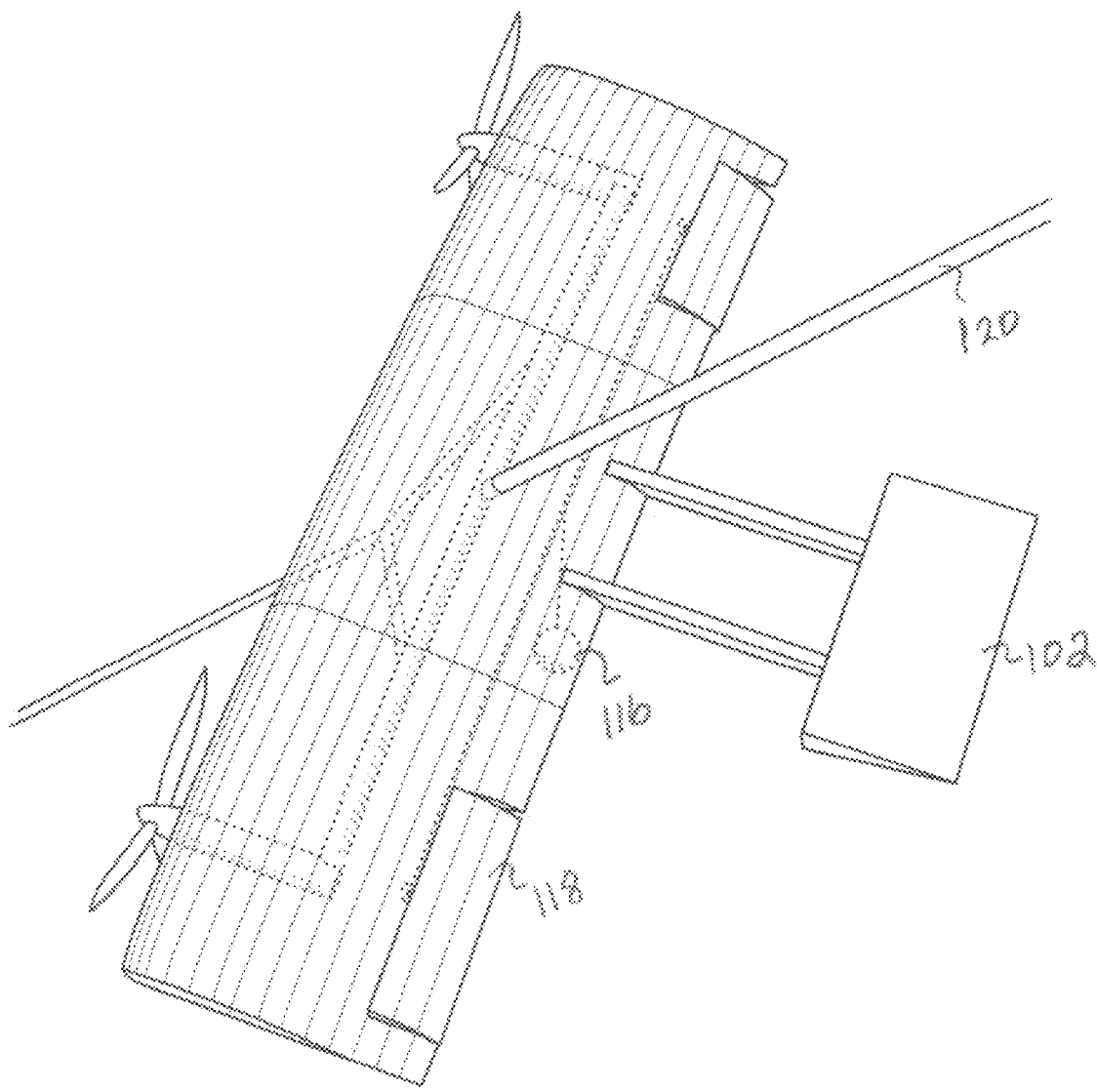
FIG. 10 is a schematic of aspects of the invention.

Referring to FIG. 10, the water foil can face the direction of flow of the water current in the ocean or other body of water. Stated differently, water currents flow from the propeller side of the water foil and across the water foil toward the horizontal stabilizer 102. The water foil is shaped so that the water current provides lift of the water foil, but not enough lift is provided by the water foil to pull the anchor from the floor of the body of water, or otherwise cause such movement of the water foil that would materially decrease the force of the water current upon the propellors. The water foil is thereby maintained at a determined depth and generally at the same position.

The horizontal stabilizer, along with the Y shaped anchor line, aids in keeping the water foil generally level as it is positioned in the water current, and aids in keeping the water foil at a desirable angle of attack relative to the water current. The horizontal stabilizer extends outwardly from the water foil a sufficient distance from the water foil to promote a stable construct. A weight 116 can extend on a line from the horizontal stabilizer. The weight can move fore and aft relative to the horizontal stabilizer and assists in keeping the water foil at a desired angle of attack. The weight can assist in allowing the horizontal stabilizer to slide along the struts in one embodiment.

The water foil can include one or more trim tabs 118 on each side of the water foil that assists in keeping the water foil in a level position. The trim tabs correspond generally to the position of ailerons of an airplane wing. A cable connects the trim tabs to a weight that positions the trim tabs. which disrupts water flow over the water foil and push the end of the water foil up or down depending upon the position of the trim tab. The trim tabs, being actuated by the weights, can rise or lower relative to the water foil to assist with maintaining the water foil in a horizontal orientation.

The distal or outlet end of the intake line 120 discharges at the surface water harvested from the deep water, providing nutrients, such as algae and phytoplankton, at the surface. The current flow at the surface, such as that provided by the Atlantic Gulf Stream, distributes these nutrients over a wide area. In a preferred embodiment, the distal end of the flexible water conduit is attached to free floating floats that allow some movement of the discharge end of the flexible water conduit across the water surface, although movement is ultimately limited by the anchored water foil. The float(s) provide some lift for the water foil, although the current flow and the shape of the water foil provide the primary lift of the device.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

Referring to FIG. 9, a system for pumping very large volumes of nutrient rich water from depths that can exceed 1000' deep to the surface in portion of the ocean including the Gulf Stream or any other ocean currents to fertilize the open ocean at the surface is shown. A large water foil shaped wing can be constructed so that it can be disposed in a stream of moving water. One or more propellers can each turn a water pump. The sweep area of the blades can determine pump size. In one embodiment, the pump only sees the pressure created by the difference in density due to temperature differences of the cold deep water and the warm surface water, which is typically small and can be approximately 0.002%. The pump, therefore, sees only a few psi and can pump tremendous volumes of water. The pumps do not need to lift the water's weight. In contrast, if a hose was 1000' in the air the pumps would have to lift the water's weight.

The water can be pumped through a large diameter flexible hose to the surface where it is released into the nutrient poor surface water. The hose can be held at the top by a large float (or multiple floats attached to the flexible hose) which can also hold up some weight of the water foil as shown in FIG. 10. In one embodiment, most, if not all, of the weight of the water foil can be up by the "kite effect" of the water flow.

The top end of the hose can be attached to the float allowing it to meander back and forth spreading the nutrient rich water as the nutrient rich water is carried with the ocean depths. In one stream, the water speed can be 4 to 6 miles per hour to allow for the kite effect.

Figure 11:
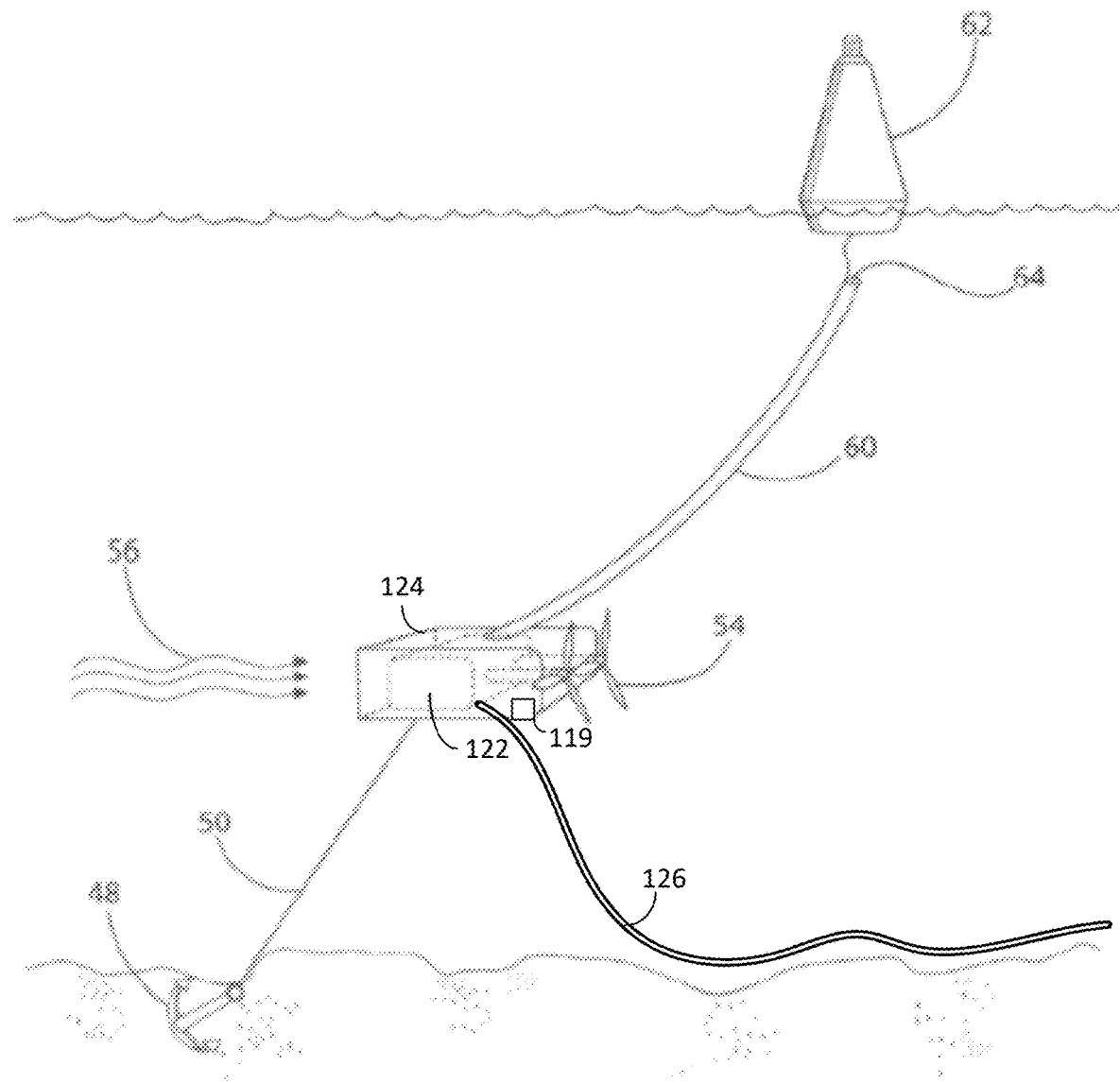
FIG. 11 is a schematic of aspects of the invention.

An anchor line can extend from the water foil to the ocean floor which could be extremely deep. The water foil can be held level by the water foil flaps which are controlled by the weight hanging down which can only swing towards the ends of the water foil like a clock pendulum as shown in FIG. 11. It can include cables which can control the flaps and keeps the water foil level. A weight in the anchor line can keep the propellers parallel. In one embodiment, a vertical stabilizer can be added to the tail. The horizontal stabilizer can keep the water foil at a desired angle of attack. This is important as the water foil can act as a kite held up by the moving water of a water flow or stream. The moving water can prevent harmful algae blooms which only occur in areas where the water is relatively still. In one embodiment, no electricity is required.

Once deployed manpower can be minimized or eliminated and minimal maintenance need only be required. For example, should one pump stop working or even seize up, the other pump will continue to operate. In one example, at 1000' deep, the water stream does not change and can have a constant ocean water stream or flow. Depth does not include forces such as waves, tides, constantly changing lighting and the effects of atmospheric weather. Therefore, this system improves reliability.

To deploy the system, a ship can contain the water foil, an anchor and a large diameter hose rolled on a reel and can travel to a water stream. An anchor can be lowered to the ocean floor. The hose can be unreeled and can float and stretch out when being pulled away from the boat by the water stream movement. A crane can lift the water foil and lowers it into the water. The propellers can immediately start turning in one embodiment. The crane can release the water foil, which falls into place at depth and can be held in place by the anchor. At this point the ship can return to port.

When implemented, this system can fertilize thousands of square miles of nutrient poor open ocean with nutrient rich deep water fertilizing algae. With nutrients algae is extremely fast growing. Wherever there is natural upwelling in the oceans there is typically quick growth in algae and phytoplankton (micro algae) which is the base of the marine food web on which all marine life depends. According to National Geographic, 70% of the Earth's oxygen is produced by phytoplankton which means 70% of the earth's carbon dioxide is captured by the algae. Only about 20% of the ocean has natural up welling's, yet these areas account for more than half of the seafood that man harvests.

This system can cause an explosion of algae and consequently a bloom of life in waters that previously were rather sterile. Algae grows 10 times more rapidly than terrestrial plants, and less than a tenth of the land is needed to produce an equivalent amount of biomass. Light normally penetrates 300 feet or less. Resulting in less biomass at depth. Algae and phytoplankton are plants, and they consume carbon dioxide. The formation of all petroleum on the planet is carbon captured by algae and phytoplankton which dies and falls to the ocean floor or is eaten by some other sea creature that dies and falls to the ocean floor. Algae are typically 5-50 microns and are essentially responsible for life in the ocean.

This system will also greatly increase micro algae called coccolithophores that naturally sequester and store carbon dioxide through photosynthesis and turn it into calcium carbonate which ends up falling to the ocean bottom. Coccolithophores, which are considered to be the most productive calcifying organisms on earth, play an important role in the marine carbon cycle. Since nutrients are the limiting factor in algae growth, the more nutrients the more productivity. With adequate nutrients almost all the algae cells divide once a day. The productivity of the open ocean is comparable to desert production. This means that most of the ocean, or about 90%, is essentially desert. This system fertilizes this less lively area and makes it productive. Many of these devices deployed in the many ocean currents around the world would reduce carbon dioxide in the atmosphere and slow global warming. Further, the cost of designing, building, and deploying each one would be relatively low.

Photosynthesis is what removes almost all carbon dioxide that is being removed from the atmosphere. All sea life's food is algae eaten directly or secondarily. Increasing their food supply is the only way to increase the number of fish and supply of seafood. Algae grows 10 times more rapidly than terrestrial plants, and less than a tenth of the land is needed to produce an equivalent amount of biomass. The only way to increase oxygen production and carbon dioxide sequestration is by increasing biomass.

As shown, the large water foil shaped wing can "fly" like a kite in an ocean stream and can be deployed by a boat. The anchor can be attached to the water foil and the other end of the anchor line can stay connected to the boat. The anchor line can be long enough for the water foil to stay at about a 1000' depth or the depth where the ocean water is cooler. Then the boat would pull the water foil causing the propellers to turn the water pumps and pump large volumes of cold water to the surface through a large diameter hose held up by floats.

Further, the boat can be disposed a few miles in front of the projected path of any potential hurricane. Most hurricanes are prevented from reaching their potential intensity by storm-induced ocean cooling. If you cool some surface water a tropical storm will not intensify. Therefore, this system can prevent, reduce, or minimize hurricanes and other storms and can reduce wind speed. Further, the system can be pulled behind by a submarine with the hose going to the surface held up by floats.

In one embodiment, the system may include a set of turbine blades positioned to interact with water currents. These blades may be configured to rotate in response to the movement of water, harnessing kinetic energy from ocean currents or streams. The rotating blades may be mechanically coupled to a generator, which may be housed within a generator assembly. As the blades turn, they may drive the generator to convert the rotational energy into electrical power.

The generator may produce electricity that can be used to power various components of the system or transmitted to other locations. Transmission lines may extend from the generator to carry the electrical power to different locations and destinations. These transmission lines may be designed to withstand underwater conditions and may run along or within other structural components of the system, such as the intake line or anchor line.

FIG. 11 illustrates a side view of a water pumping system for transferring deep ocean water to shallower depths. The system includes an anchor assembly 48 secured to an anchor line 50 that extends upward through the water column. A propeller 54 is positioned to interact with a water current 56, which flows across the propeller to generate mechanical energy. The intake line 60 extends upward from the lower portion of the system toward the ocean surface. A buoy 62 is attached to support the outlet end 64 of the intake line 60 at or near the water surface. The outlet end 64 allows for the discharge of water pumped from deeper depths. A generator 122 is housed within a generator assembly 124 and converts the mechanical energy from the propeller 54 into electrical power. A transmission line 126 carries the electrical power from the generator 122 to other locations and destination, such as on shore. The arrangement allows the system to harness energy from the water current 56 to generate electricity.

Figure 12:
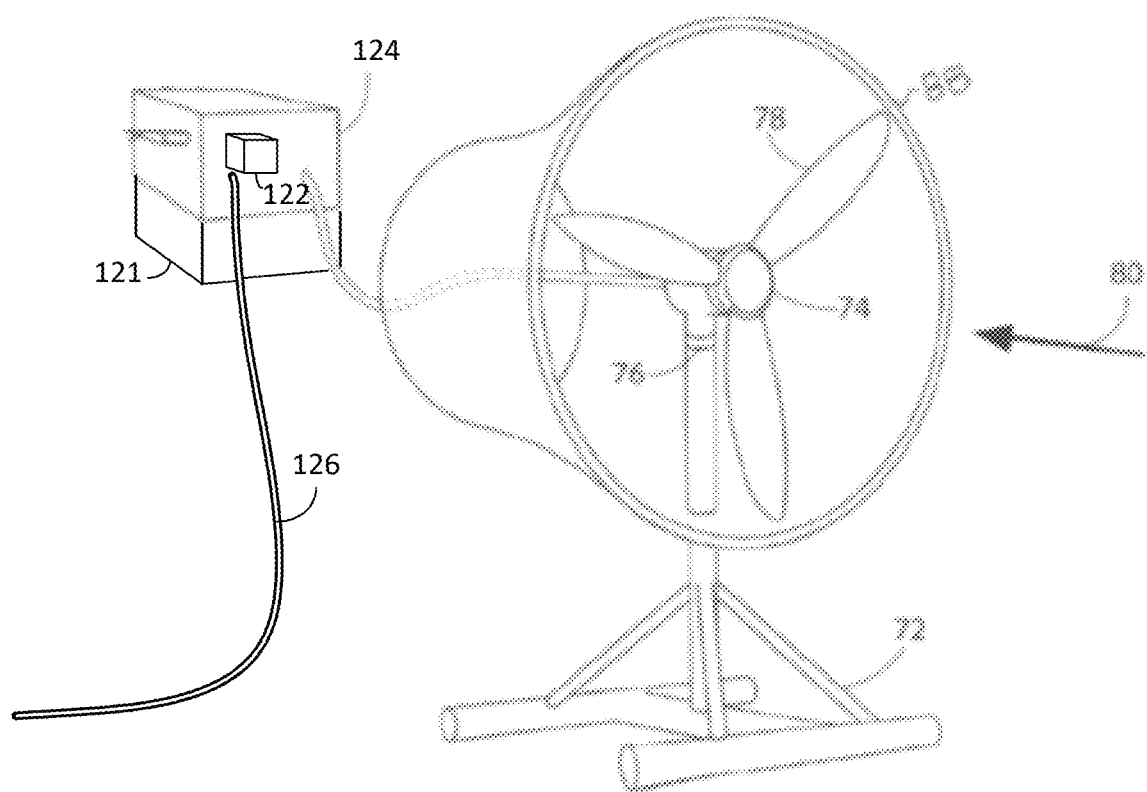
FIG. 12 is a schematic of aspects of the invention.

FIG. 12 illustrates an orthogonal view of an energy conversion assembly for converting water current energy into electrical power. The assembly includes a support base 72 that provides a foundation for mounting the other components. An energy conversion system 74 is mounted to the support base 72 via a rotational bearing 76, which may allow the energy conversion system 74 to rotate and align with the water current 80. The energy conversion system 74 includes a turbine blade 78 positioned to interact with the water current 80. A shroud housing 85 may surround the turbine blade 78 to help direct and concentrate the water flow. The generator assembly 124 contains a generator 122 that may convert the mechanical energy from the turbine blade 78 into electrical power. A transmission line 126 extends from the generator 122 to transmit the generated electrical power to other destinations. In one embodiment, the electrical power is transmitted to storage assembly such as a battery pack.

The rotational bearing 76 may enable the energy conversion system 74 to pivot and maintain alignment with the water current 80, potentially maximizing energy capture efficiency. The shroud housing 85 may help channel the water current 80 toward the turbine blade 78, while also providing protection for the internal components. In some aspects, the support base 72 may be anchored to the ocean floor or attached to a larger structure to maintain the position of the energy conversion assembly in the water. The turbine blade 78 may have various designs, such as a propeller-style blade or a vertical-axis turbine, depending on the specific requirements of the system and the characteristics of the water current. The generator 122 may be a direct-drive generator or may be coupled to the turbine blade 78 through a gearbox to optimize the rotational speed for power generation. In some cases, the transmission line 126 may include power conditioning equipment to regulate the electrical output before it is distributed to other parts of the system or transmitted to shore.

Figure 13:
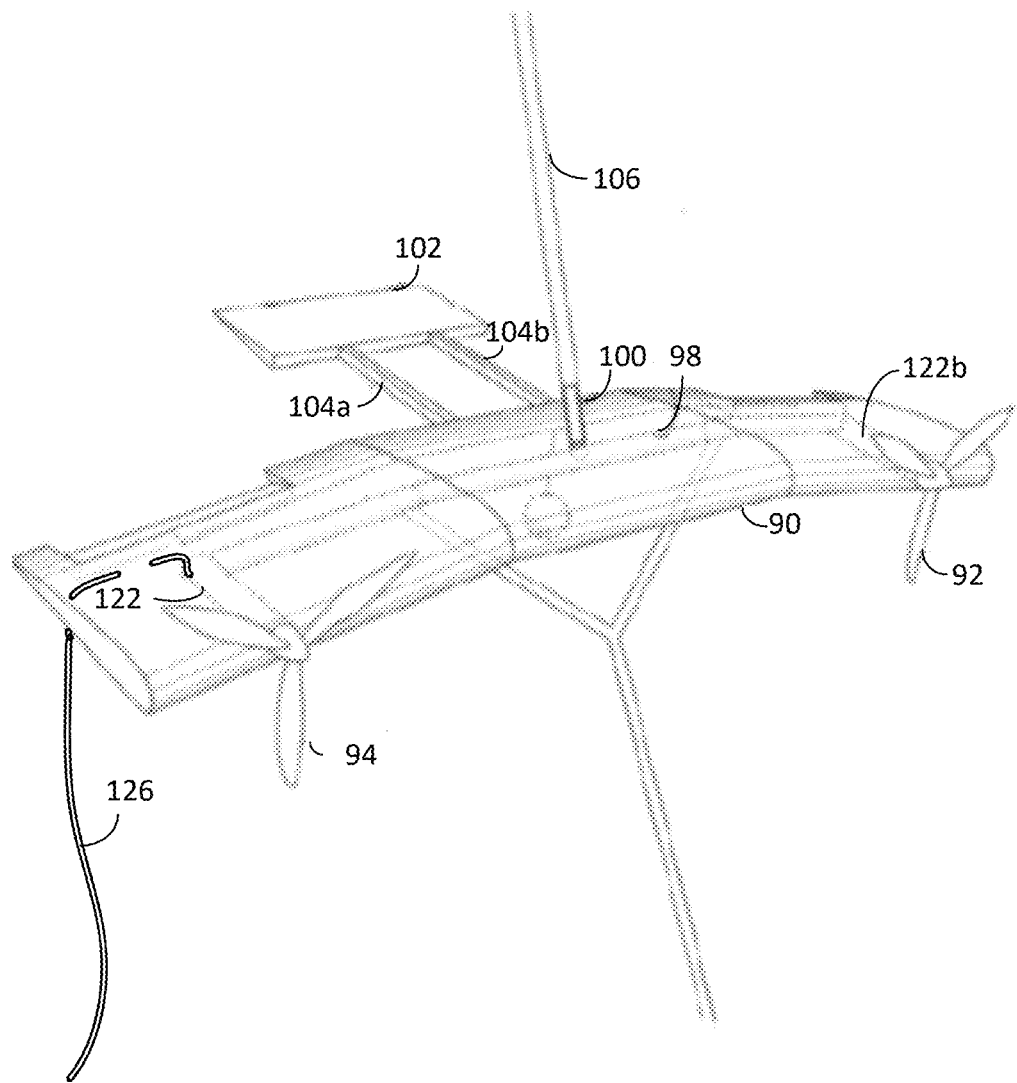
FIG. 13 is a schematic of aspects of the invention.

FIG. 13 illustrates an orthogonal view of a water foil assembly. The water foil 90 includes a first propeller 92 and a second propeller 94 positioned at opposite ends of the water foil 90. A horizontal stabilizer 102 extends from the water foil 90, supported by support strut 104. The horizontal stabilizer 102 may help maintain the orientation of the water foil 90 when subjected to water currents. A generator 122 may be positioned near one end of the water foil 90, with a transmission line 126 extending from the generator 122 to provide power transmission capabilities. The water foil assembly provides a configuration where the propellers 92, 94 can interact with water currents while the horizontal stabilizer 102 and support strut 104 may help maintain proper positioning. The generator 122 and transmission line 126 may enable power generation and distribution.

Figure 14:
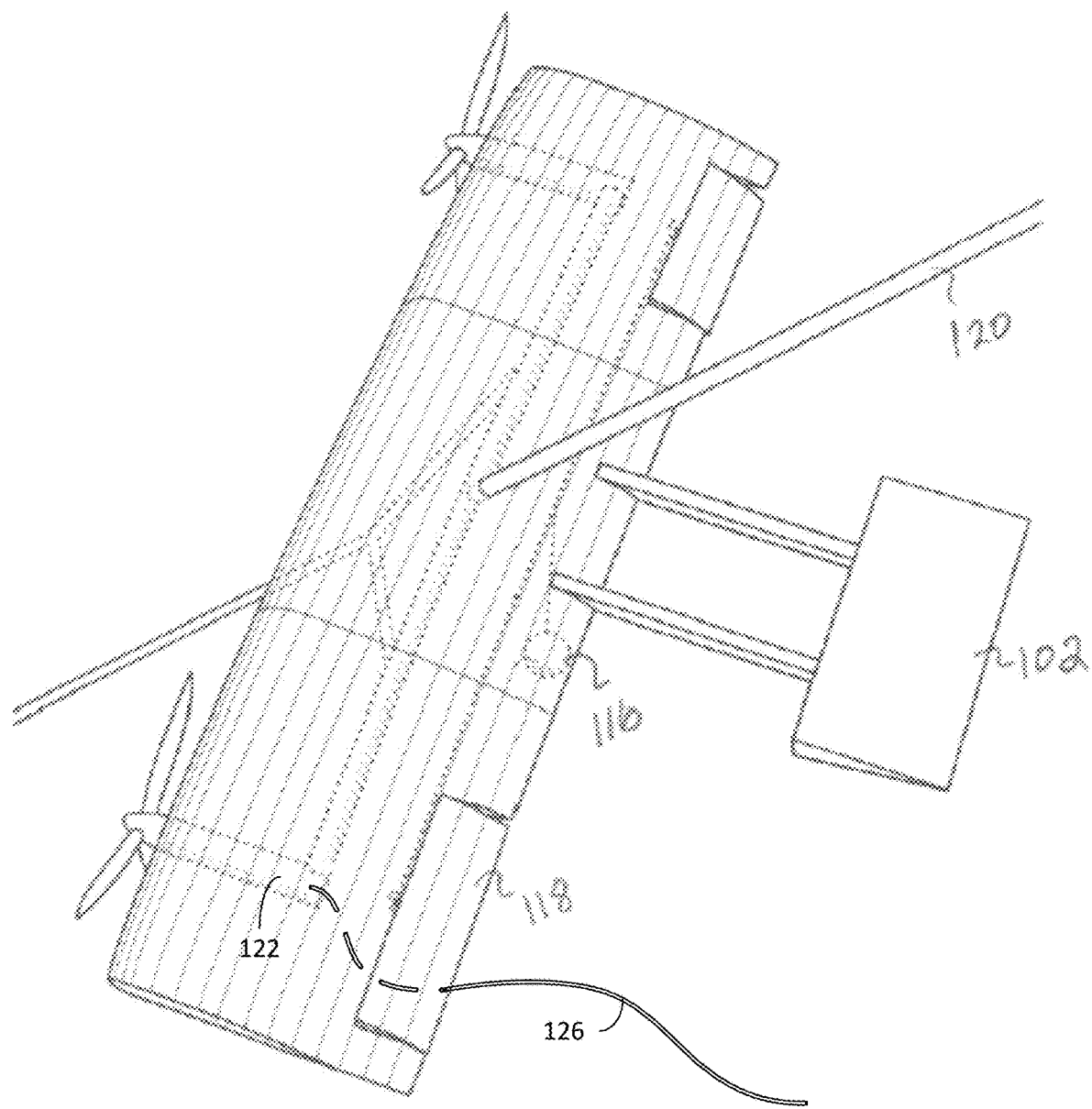
FIG. 14 is a schematic of aspects of the invention.

FIG. 14 illustrates an orthogonal side view of a water pumping system. The horizontal stabilizer 102 extends outward from the main structure and includes a stabilizer weight 116 that can move relative to the horizontal stabilizer 102. A trim tab 118 is positioned to assist in maintaining horizontal orientation of the system. A generator 122 is positioned within the system to provide power generation capabilities. A transmission line 126 extends from the generator 122 to distribute electrical power to other components of the system or other destinations. The arrangement shows how the horizontal stabilizer 102 and trim tab 118 work together to maintain proper orientation while the stabilizer weight 116 provides additional stabilization. The generator 122 and transmission line 126 provide power generation and distribution functionality.

The electrical energy generated by the generator may be transmitted, distributed, or stored in various ways. In some aspects, the transmission line may carry the electrical power directly to other components of the system or to external destinations such as onshore facilities. The power distribution system may include transformers, inverters, or other power conditioning equipment to regulate voltage and current for different applications. In some cases, the generated electrical energy may be stored for later use. The system may incorporate energy storage devices such as battery packs. These battery packs may include lithium-ion batteries, lead-acid batteries, rechargeable battery technologies suitable for marine environments or other electrical storage assembles. The battery storage capacity may be scaled to match the power generation capabilities of the system and the intended energy usage patterns.

The energy storage system may also include capacitors, which can provide rapid charge and discharge capabilities for short-term energy storage needs. In some implementations, a hybrid storage system combining batteries and capacitors may be used to balance long-term energy storage with the ability to handle power surges. The stored energy may be used to power various components of the water pumping system during periods of low current flow, or it may be used to supplement power delivery during peak demand periods in other applications such as onshore applications. In some configurations, the energy storage system may be modular, allowing for easy expansion or replacement of individual storage units as needed.

In one embodiment, one or more floats on the ocean surface can support the weight of the hose and of an electric motor or water pump which is anchored to the ocean floor at the level of optimum nutrient water. The electricity can be supplied by underwater electric cable from shore or an anchored boat with a diesel generator. The electric cable could fork to one or more pumping systems. In one embodiment, the system can use a diesel electric generator on the boat that is not connected to or supporting the water foil allowing the float at the end of the water tube to support the electric water pump at depth.

The water foil can act as a "kite" in the ocean current and can move in pattern including figure eight motions which causes it to "fly" through the water several times faster than the current itself. This motion can increase the power produced by the blades and allow even more water to be pumped to the surface. This motion can be controlled by having control surfaces reverse at the end of each section of the pattern and swing automatically without any outside or electrical control.

In one embodiment, the water foil system can be disposed in the path in front of a tropical storm or hurricane. A pump can be driven by an electric motor which can eliminate the need for blades. A generator on a towing boat can supply the electricity for the pump via an electric cable running down the towing line of the water foil.

What is claimed is:

1. An energy generation system, comprising:
   a wing configured to be disposed in an ocean current;
   blades attached to the wing and configured to be actuated by the ocean current;
   a generator operatively coupled to the blades and configured to be actuated by the blades;
   wherein the generator is configured to produce electrical energy, and wherein the electrical energy is configured to be at least one of transmitted energy to another location; or stored energy using an energy storage assembly;
   an anchor line connected to the wing and configured to secure the wing at a predetermined depth in the ocean current wherein the wing comprises a hydrofoil shape configured to generate lift in the ocean current; and,
   a horizontal stabilizer attached to the wing and configured to maintain the wing in a substantially horizontal orientation wherein the horizontal stabilizer includes a weight configured to move fore and aft relative to the horizontal stabilizer to adjust an angle of attack of the wing and adapted to maintain the wing in the current.

2. The energy generation system of claim 1, further comprising trim tabs attached to the wing and configured to assist in maintaining the wing in a level position.

3. The energy generation system of claim 2, wherein the generator is housed in a water-resistant enclosure attached to the wing.

4. A water current power generation system,
   comprising: a wing configured to be submerged in a water current;
   a generator attached to the wing; and
   a propeller attached to the generator, wherein the propeller is configured to be actuated by the water current to drive the generator;
   an anchor line connected to the wing and configured to secure the wing at a predetermined depth in the water current wherein the wing comprises a hydrofoil shape configured to generate lift in the water current;
   a horizontal stabilizer attached to the wing and configured to maintain the wing in a substantially horizontal orientation wherein the horizontal stabilizer includes a weight configured to move fore and aft relative to the horizontal stabilizer to adjust an angle of attack of the wing.

5. The water current power generation system of claim 4, further comprising trim tabs attached to the wing and configured to assist in maintaining the wing in a level position.

6. The water current power generation system of claim 4, wherein the generator is housed in a water-resistant enclosure attached to the wing.

* * * * *